(12) United States Patent
Haf et al.

(10) Patent No.: US 11,787,268 B2
(45) Date of Patent: Oct. 17, 2023

(54) AIR TREATMENT APPARATUS

(71) Applicant: AGCO International GmbH, Neuhausen (CH)

(72) Inventors: Dietmar Haf, Marktoberdorf (DE); Fabian Kögel, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 426 days.

(21) Appl. No.: 17/116,690

(22) Filed: Dec. 9, 2020

(65) Prior Publication Data
US 2021/0188052 A1     Jun. 24, 2021

(30) Foreign Application Priority Data
Dec. 9, 2019   (GB) .................................. 1917946

(51) Int. Cl.
*B60H 3/06*     (2006.01)
*B60H 1/00*     (2006.01)

(52) U.S. Cl.
CPC ....... *B60H 3/0625* (2013.01); *B60H 1/00378* (2013.01); *B60H 1/00485* (2013.01)

(58) Field of Classification Search
CPC .............. B60H 3/0625; B60H 1/00378; B60H 1/00485
See application file for complete search history.

(56) References Cited

U.S. PATENT DOCUMENTS

| | | | | |
|---|---|---|---|---|
| 11,518,211 | B2 * | 12/2022 | Haf ...................... | B60H 3/0633 |
| 2008/0014856 | A1 | 1/2008 | Voit et al. | |
| 2016/0367928 | A1 | 12/2016 | Leconte et al. | |
| 2021/0070149 | A1 * | 3/2021 | Toppani ................ | B60H 3/0658 |
| 2021/0170828 | A1 * | 6/2021 | Haf ....................... | B60H 3/0658 |
| 2022/0176289 | A1 * | 6/2022 | Kögel ................ | B60H 1/00378 |

FOREIGN PATENT DOCUMENTS

| | | |
|---|---|---|
| EP | 1 101 641 A2 | 5/2001 |
| WO | 2019/120880 A | 6/2019 |
| WO | 2019/120902 A1 | 6/2019 |
| WO | 2019/130196 A1 | 7/2019 |

OTHER PUBLICATIONS

UK Intellectual Property Office, Search Report for UK priority Application No. GB1917946.4, dated May 20, 2020.
European Patent Office, Search Report for related European Application No. EP20 20 8008, dated May 6, 2021.

* cited by examiner

*Primary Examiner* — Gonzalo Laguarda

(57) ABSTRACT

An air treatment apparatus for an operator environment of an agricultural vehicle in which air to be filtered is drawn into an air filtration system, filtered and directed to an agricultural vehicle HVAC system. The air filtration system includes first and second filtration devices having respectively coarser and finer levels of filtration. Each filtration device is provided with a respective bypass permanently connected with an inlet end downstream of a valve mechanism that selects between the filtration devices, and an outlet end upstream of the valve mechanism and adjacent the respective filtration device. In use a portion of air flow downstream of the valve mechanism may be recirculated to purge the respective filtration device, and each bypass includes a respective non-return valve opposing transit of air from the outlet to the inlet ends.

12 Claims, 4 Drawing Sheets

FIG. 1
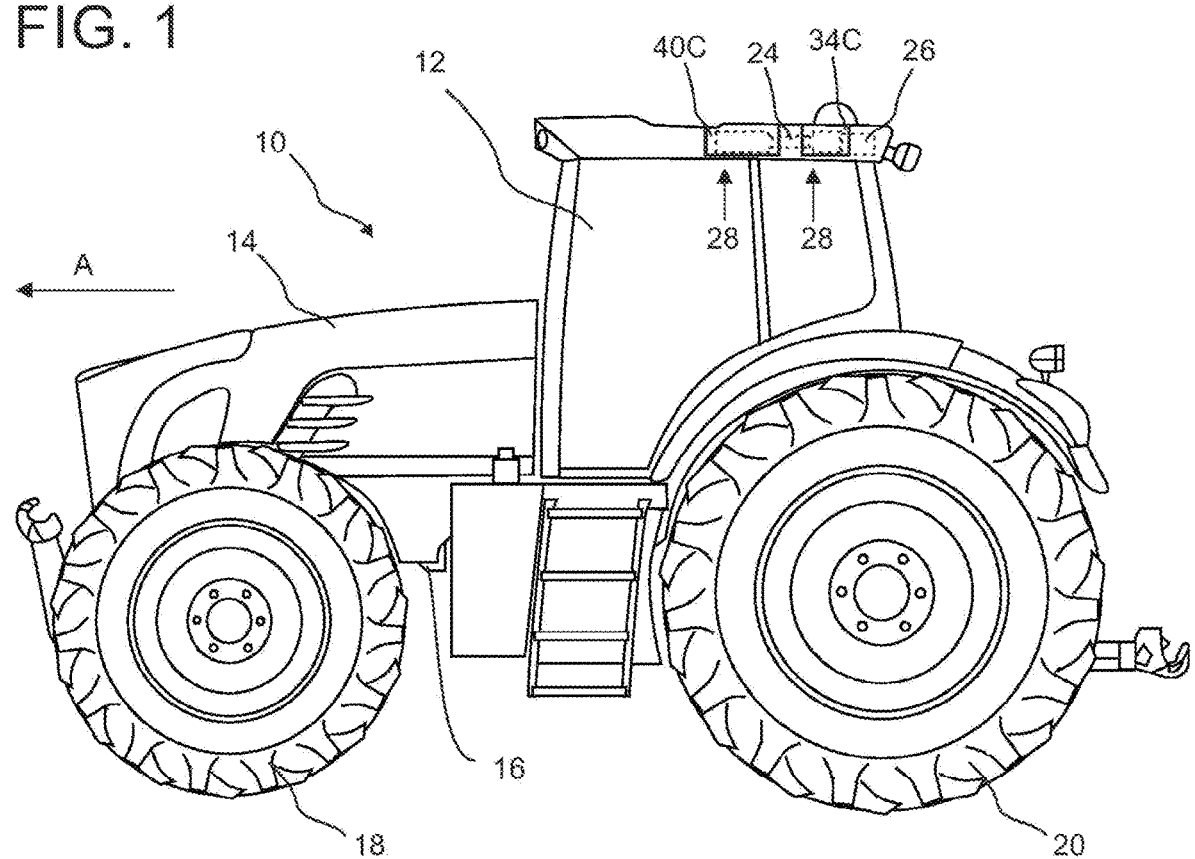
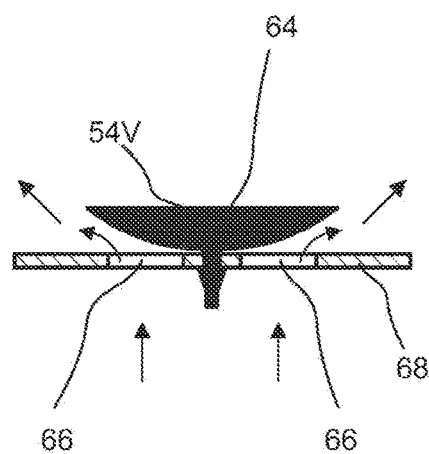
FIG. 6A
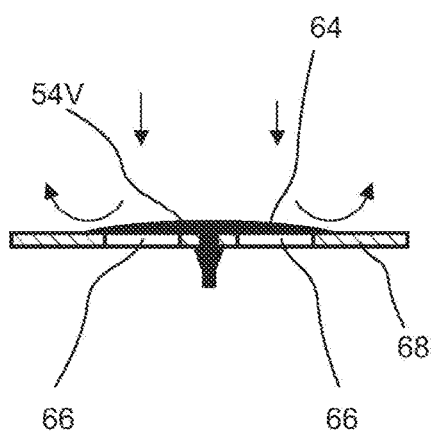
FIG. 6B

AIR TREATMENT APPARATUS

BACKGROUND

Field

The present invention relates to an air treatment apparatus, in particular to an air treatment apparatus for an operator environment or cab of an agricultural vehicle or a similar vehicle.

Description of Related Art

Agricultural vehicles are known to operate in environments in which many different kinds of particulate or contaminant are present. This creates a requirement for filtration of the air for operators of such vehicles when in use. The particulates may be of different sizes and of different natures, for example larger particulates such as dust, pollen and the like and smaller contaminants such as fumes, aerosols and vapours.

It is known to provide separate air filters to provide selective filtering of the air supply to a vehicle operator. For example a first filter may be used when the predominant contaminant in the working environment of the agricultural vehicle is relatively large (for example when traversing a field) and a second filter is used when the predominant contaminant in the working environment is relatively small (for example when applying a herbicide, pesticide or similar).

Also, legislation in various countries now requires the use of filters of a particular rating to filter out particular contaminants from the air which would otherwise be introduced into the operator environment or cab of the agricultural vehicle. For example in the EU, EU Standard EN 15695 provides for four categories of filter for cabin protection, where Category 2 (hereinafter "CAT2") protects only against dust but does not protect against aerosols and vapours, Category 3 (CAT3) protects against dust and aerosol, but not vapours and Category 4 (CAT4) protects against dust, aerosols and vapours. In this context, CAT3 filters tend to be more expensive than CAT2 filters, with CAT4 being most expensive. Accordingly, it is beneficial to the working life of the higher rated filters if they can be cleaned rather than replaced. It is a further advantage if such filters can be cleaned when in service on the agricultural vehicle rather than being removed while being cleaned (requiring replacement during cleaning or enforced downtime of the agricultural vehicle).

BRIEF SUMMARY

According to a first aspect of the present invention there is provided an air treatment apparatus for an operator environment of an agricultural vehicle in which air to be filtered is drawn into an air filtration system, filtered and directed to an agricultural vehicle HVAC system, in which the HVAC system comprises an inlet plenum, at least one blower, other HVAC components and an outlet to the operator environment;
wherein the air filtration system comprises:
at least one external inlet;
a first filtration device having a first coarser level of filtration located between the external inlet and the HVAC inlet plenum;
a second filtration device having a second finer level of filtration located between the external inlet and the HVAC inlet plenum;
a first air filtration system blower connected to the HVAC inlet plenum;
a valve mechanism selectively to connect either the first filtration device to the HVAC inlet plenum or the second filtration device to the inlet HVAC plenum; and
for each filtration device, a respective bypass permanently connected with an inlet end downstream of the valve mechanism and an outlet end upstream of the valve mechanism and adjacent the respective filtration device such that in use a portion of an air flow downstream of the valve mechanism may be recirculated to purge the respective filtration device, and each bypass includes a respective non-return valve opposing transit of air from the outlet to the inlet ends. The outlet end of each bypass is preferably located between the respective filtration device and the valve mechanism.

Suitably, the inlet end of each bypass may be connected to draw air directly from the operator environment. In a first alternative arrangement, where the apparatus has first and second air filtration system blowers connected in series, with the first blower being located between the valve mechanism and the second blower, and the second blower being configured to produce a higher throughput of air than the first blower, the inlet end of each bypass may be connected to draw air directly from the output of the first blower. In a further alternative arrangement, where the apparatus has first and second air filtration system blowers connected in series, with the first blower being located between the valve mechanism and the second blower, and the second blower being configured to produce a higher throughput of air than the first blower, the inlet end of each bypass may be connected to draw air directly from the output of the second blower ahead of the other HVAC components.

In one of the alternative arrangements of the preceding paragraph, where the apparatus has first and second air filtration system blowers connected in series, with the first blower being located between the valve mechanism and the second blower, and the second blower being configured to produce a higher throughput of air than the first blower, a recirculation line may be provided having an inlet drawing air from the operator environment and an outlet in the line between the first and second air filtration system blowers. A third filtration device may be provided in the recirculation line.

The valve mechanism preferably selectively connects either the first filtration device to the HVAC inlet plenum or the second filtration device to the HVAC inlet plenum such that in use an air flow is directed from one or the other of the filtration devices to the HVAC inlet plenum.

Preferably, the first filtration device is adapted to filter dust particles and conforms to CAT2. Preferably, the second filtration device is adapted to filter dust, aerosols and vapour and conforms to CAT4.

The present invention further provides an agricultural vehicle comprising an operator environment, and an air treatment apparatus as recited above.

BRIEF DESCRIPTION OF THE DRAWINGS

The invention will now be described, by way of example only, in which

FIG. 1 shows a utility vehicle in the form of a farm tractor including an air filtration apparatus;

FIGS. 6A and 6B illustrate a non-return valve used in the present invention.

DETAILED DESCRIPTION OF SPECIFIC EMBODIMENTS

Figure 2:
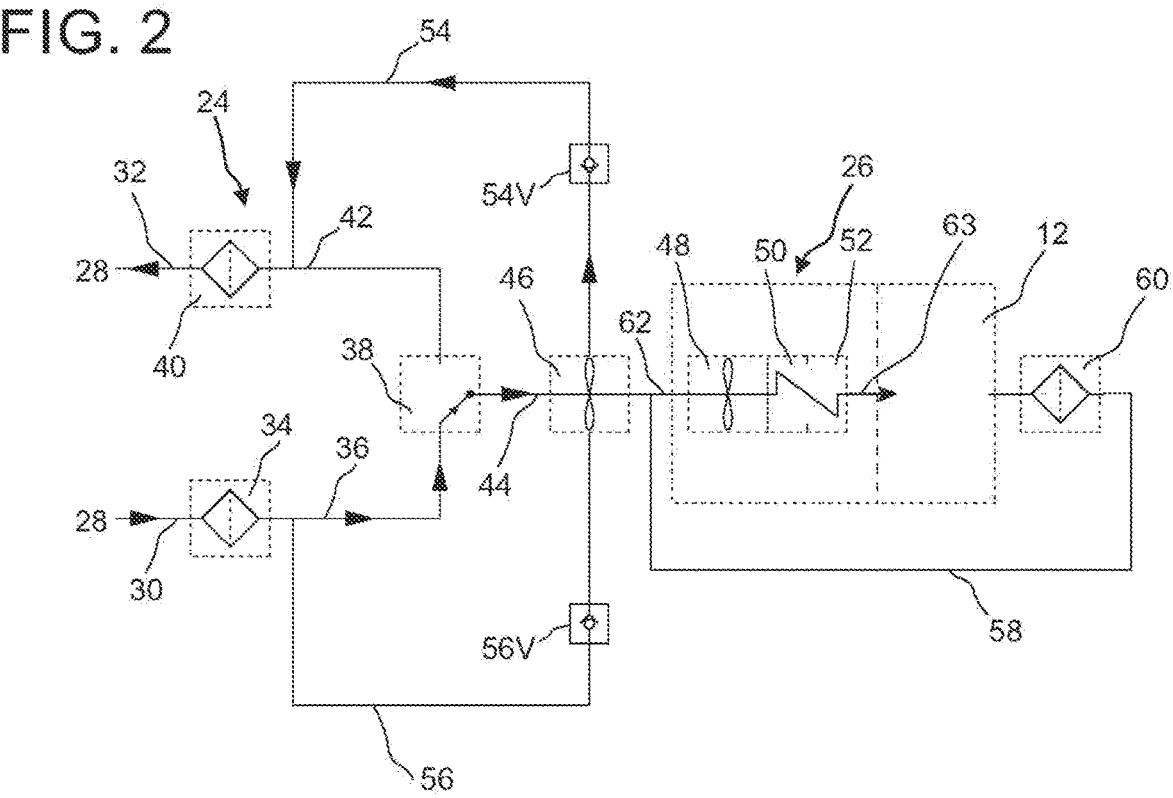
FIG. 2 shows a schematic view of a first embodiment of an air filtration apparatus in accordance with the present invention in a first operating condition.

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Referring to FIG. 1, an agricultural/utility vehicle in the form of a tractor 10 is shown having an operator environment in the form of a cab 12 and an engine compartment 14. A chassis 16 which is partly visible connects front wheel suspension and steering assembly 18 and rear axle assembly 20. The cab 12 has a roof assembly 22 within which is mounted an air filtration apparatus 24 and HVAC (heating, ventilation and air conditioning) unit 26. Two inlets (represented by arrows 28) for the air filtration apparatus and HVAC unit are located under an eaves overhang on a side of the roof assembly 22, although it will be appreciated that a single inlet may alternately be provided. Openable covers 40C, 34C in a side wall of the roof assembly 22 enable user access for inspection and/or replacement of respective filtration devices, as described further below.

Figure 3:
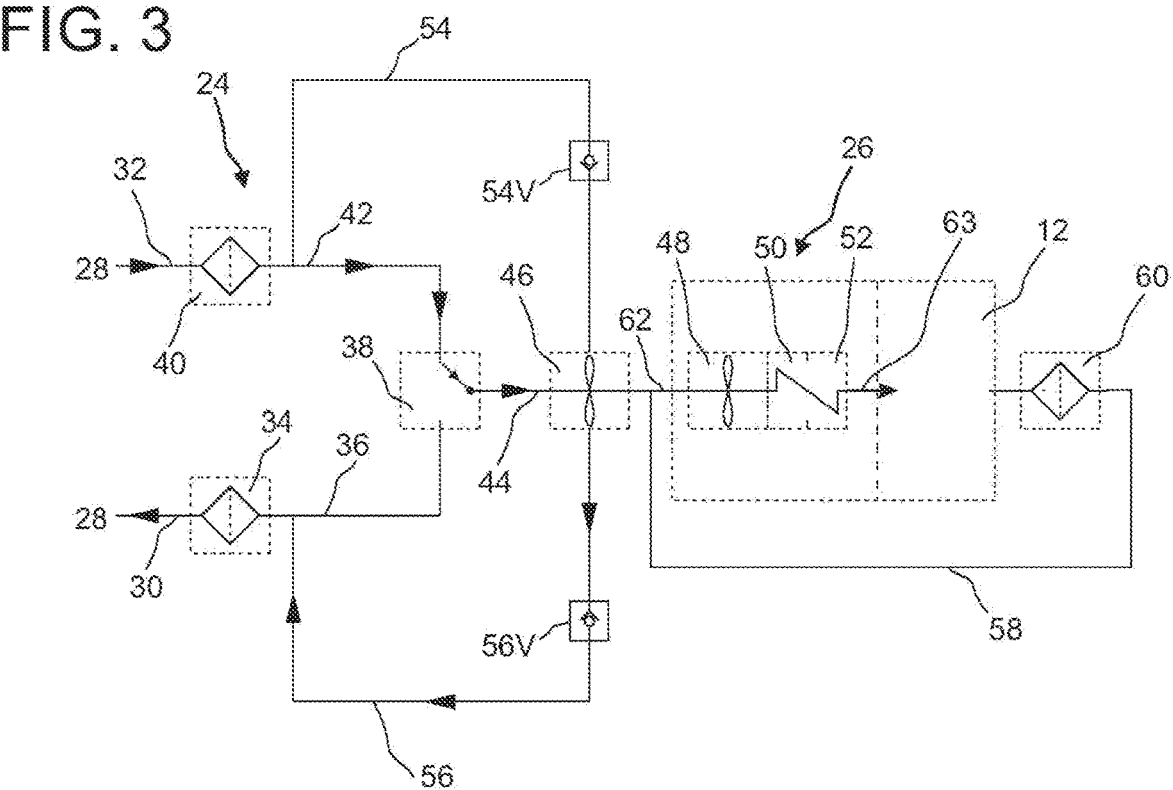
FIG. 3 shows a schematic view of the air filtration apparatus of FIG. 2 in a second operating condition.

With reference to FIGS. 2 and 3, a schematic view of a first embodiment of an air filtration apparatus is shown comprising the air filtration system indicated generally at 24 (to the left of the figure) connected to the HVAC system indicated generally at 26 (to the right of the figure) for the operator environment or cab 12 of the agricultural vehicle 10.

The external inlet or inlets 28 feed a first vent or duct 30 and a second vent or duct 32 by which air to be filtered is drawn into the filtration system. As mentioned above, the first and second vents or ducts 30, 32 may be provided with individual external inlets 28 in a preferred arrangement, or may share a common inlet.

The first vent or duct 30 is directed to a first filtration device 34 having a first coarser level of filtration. The first filtration device 34 is conveniently suitable for extracting dust particles and the like from the externally fed air. By way of example, this may be a Category 2 (CAT2) dust filter. The first filtration device 34 is provided with an outlet 36. The outlet 36 is connected to a first inlet side of a valve mechanism 38.

The second vent or duct 32 is directed to a second filtration device 40 having a second finer level of filtration. The second filtration device 40 is conveniently suitable for extracting dust, aerosols, vapour and the like from the externally fed air. By way of example, this may be a Category 4 (CAT4) filter. The second filtration device 40 is provided with an outlet 42, which outlet 42 is connected to a second inlet side of the valve mechanism 38.

The valve mechanism 38 is provided with an outlet conduit 44. The valve mechanism allows air flow from the second filtration device 40 to the outlet conduit 44 while isolating the first filtration device 34 or, alternatively allows air flow from the first filtration device 34 to the outlet conduit 44 while isolating the second filtration device 40.

The valve mechanism 38 may be operated by any convenient means, for example automatically following a suitable signal received from a suitable sensor, automatically following actuation of a suitable device for example a sprayer, or by the direct action of a driver actuating suitable means within the cab.

The outlet conduit 44 is connected to an inlet plenum of a first fan or air impeller device, pressurisation blower 46, the output of which is connected to the input of a second fan or air impeller device, main blower 48, of the HVAC system 26.

The HVAC system typically includes additional components downstream of the main blower 48, such as by way of example a evaporator 50 and a heater 52 (see also description of FIG. 7 below), the output of which directs the treated air flow to the cab 12 by way of a cabin air supply duct 63.

In this first embodiment, a first (inlet) end of a first bypass channel or passage 54 is connected to an outlet of the pressurisation blower 46. A second (outlet) end of the first bypass channel or passage 54 is located between the second filtration device 40 and the valve mechanism 38. A non-return valve 54V is provided in the bypass channel 54 opposing the flow of air from the second to the first ends.

Also, a first (inlet) end of a second bypass channel or passage 56 is connected to an outlet of the pressurisation blower 46. A second (outlet) end of the second bypass channel or passage 56 is located between the first filtration device 34 and the valve mechanism 38. As for the first bypass, a non-return valve 56V is provided in the bypass channel 56 opposing the flow of air from the second to the first ends.

A air recirculation path 58 is provided by a conduit extending between the cab 12 and the inlet to the main blower 48 as will be described further below. The further air recirculation path 58 suitably includes a dust filter 60 (preferably in the form of a simple cartridge filter easily replaceable by a user) to prevent dust from the ambient air within the cab 12 from being passed to the main blower 48 and downstream components 50, 52 and thereby reintroduced to the cab.

The typical operating position of the valve mechanism 38 is that shown in FIG. 2, with inlet air drawn through the first coarser CAT2 filtration device 34. However, when there is a need to extract aerosols, vapour and the like the system is switched to the configuration shown in FIG. 3 with inlet air drawn through the second finer CAT4 filtration device 40.

To adopt the configuration shown in FIG. 3, the valve mechanism 38 is moved to the position shown and the pressurisation and main system blowers 46, 48 are also actuated. Air is drawn into the air filtration system through the second vent or duct 32 and drawn through the second CAT4 filtration device 40 to remove dust, aerosols, vapour and the like entrained in the air. The air is directed through the valve mechanism 38 to the outlet conduit 44 and then drawn by the pressurisation and main blowers 46, 48 into the HVAC system and onward via the additional components 50, 52 to the cab air supply duct. In this position, the valve mechanism 38 prevents communication between the first filtration device 34 and the blowers 46, 48.

In addition, due to the overpressure of a portion of the air drawn into the HVAC system is drawn or recirculated through the bypass channel or passage 56 to the region between the first filtration unit 34 and the ventilation mechanism 38 where, due to the closed state of the valve, the recirculated air is directed back through the first filtration device 34, thereby removing trapped dust and the like from the first filtration device 34 and directing these back out through vent or duct 30 and inlet 28. For this reason, separate inlets 28 for the ducts 30, 32 are preferred to reduce the risk of ejected particulate matter from one filter being drawn into the other.

In addition, due to the overpressure of a portion of the air drawn into the HVAC system is drawn or recirculated through the bypass channel or passage 56 to the region between the first filtration unit 34 and the valve mechanism 38 where, due to the closed state of the valve, the recirculated air is directed back through the first filtration device 34, thereby removing trapped dust and the like from the first filtration device 34 and directing these back out through vent or duct 30 and inlet 28. For this reason, separate inlets 28 for the ducts 30, 32 are preferred to reduce the risk of ejected particulate matter from one filter being drawn into the other.

Once the need to extract aerosols, vapour and the like has passed, the valve mechanism 38 is caused to adopt the position shown in FIG. 2. In this position, the valve mechanism 38 prevents air flowing from the second filtration device 40 to the pressurisation blower 46 and on to the inlet plenum of the main blower 48.

Air is drawn into the air filtration system from the inlet 28 through the first vent or duct 30 and directed through the first filtration device 34 to remove dust and the like entrained in the air. The air passes through the valve mechanism 38 to its outlet conduit 44 and is then drawn by the pressurisation and main blowers 46, 48 into the HVAC system and (via components 50, 52) out through the cab air supply duct.

As before, due to the overpressure a portion of the air drawn into the HVAC system by the pressurisation blower 46 is drawn or recirculated through the second bypass channel or passage 56 to the region between the second filtration unit 40 and the valve mechanism 38, where, due to the closed state of the valve, the recirculated air is directed back through the second filtration device 40, thereby removing trapped dust, vapour and aerosol particles and the like from the second filtration device 40 and directing these back out through vent or duct 32 and inlet 28.

This has as an advantage that the air filtered by the first filtration device 34 is used to clean the second filtration device 40. It can be seen that the second filtration device 40 is being cleaned whenever the first filtration device 34 is in operation. As before it is a further advantage that the use of the portion of the treated air to clean the second filtration device 40 results in a gentler cleaning action than if the pressurisation blower 46 associated with the second filtration device 40 was simply reversed to drive air back through the second filtration device 40. This results in a prolonged life for the second filtration device 40.

Figure 4:
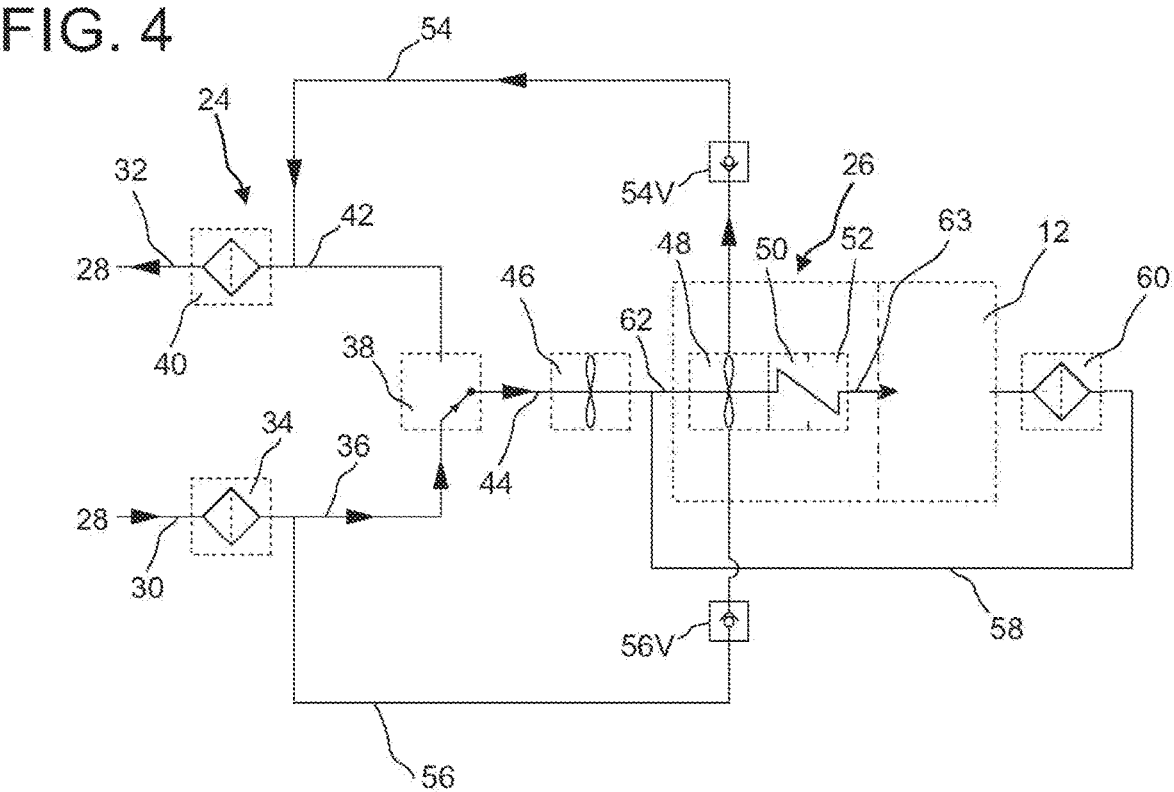
FIG. 4 shows a schematic view of a second embodiment of an air filtration apparatus in accordance with the present invention.

A second embodiment of an air treatment apparatus in accordance with the present invention is shown in FIG. 4. Like reference numerals are used to refer to like parts. The difference in this embodiment is that the inlets to the two bypass channels 54, 56 are fed from the main blower 48 (rather than the plenum blower 46).

Figure 5:
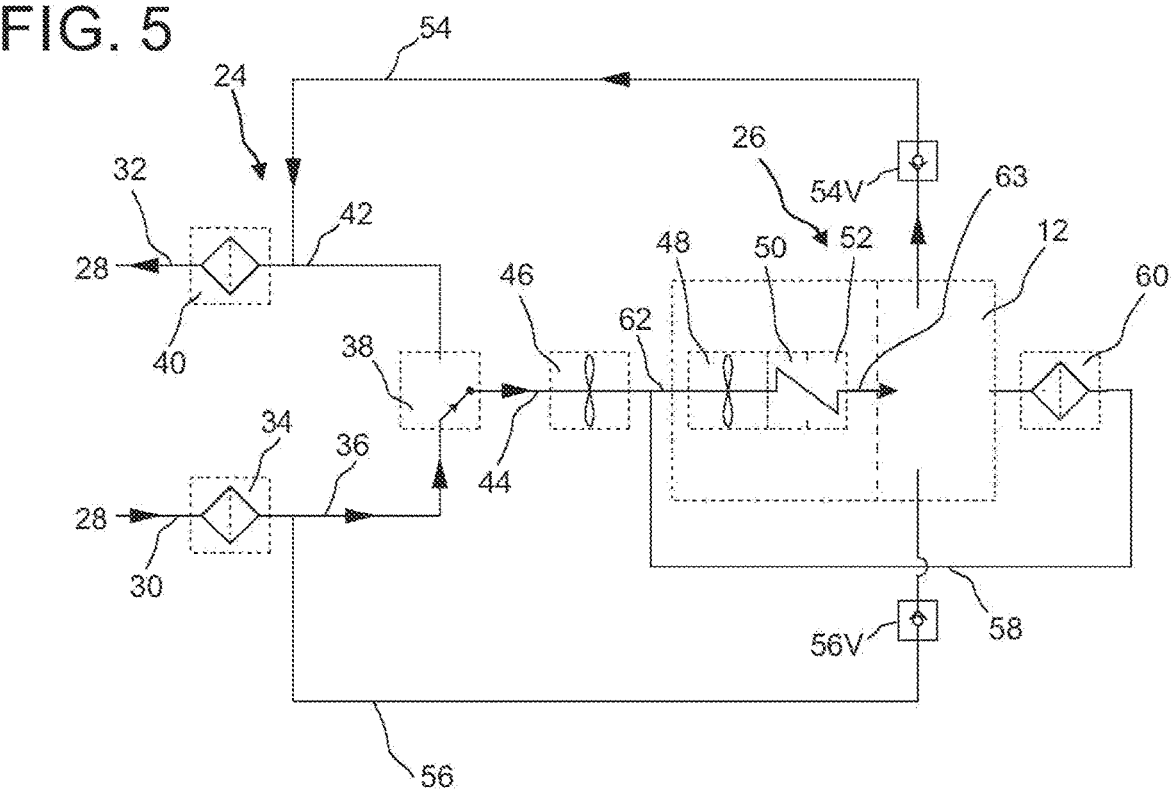
FIG. 5 shows a schematic view of a third embodiment of an air filtration apparatus in accordance with the present invention.
Figure 7:
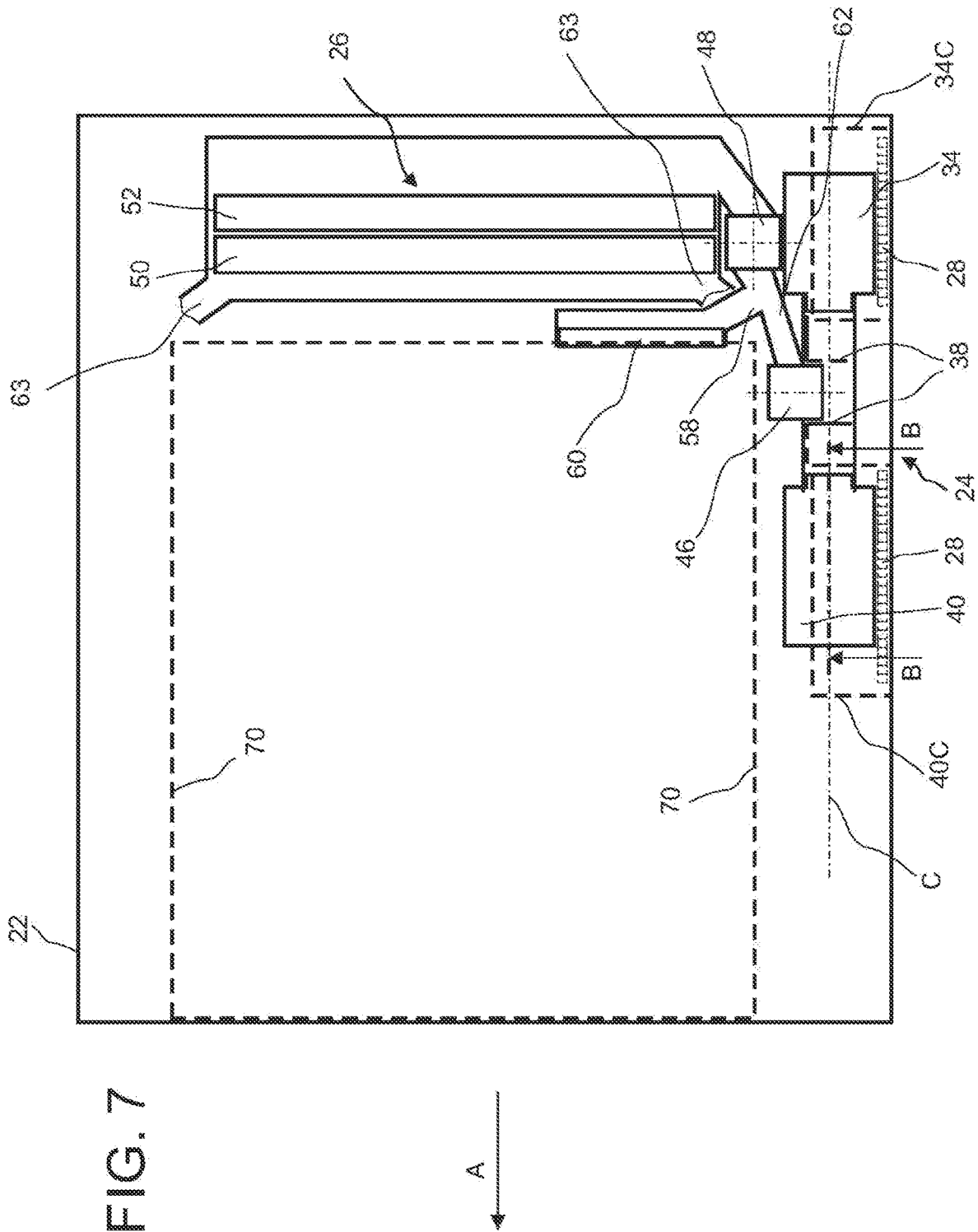
FIG. 7 schematically represents the layout of components of the air filtration apparatus installed in the roof of the tractor of FIG. 1.

A third embodiment of an air treatment apparatus in accordance with the present invention is shown in FIG. 5. Like reference numerals are used to refer to like parts. The difference in this embodiment is that the inlets to the two bypass channels 54, 56 are fed by overpressure from the cab space 12 (rather than directly from the plenum or main blowers 46, 48). More alternatively the overpressure could be taken from duct 63 connecting the HVAC unit 26 and the cab space 12 as shown in FIG. 7. The overpressure may also arise from the cab door being shut.

The presence of non-return valve 54V, 56V in bypass channels 54,56 ensure that no air can pass from air filtration apparatus 24 to HVAC unit 26 through bypass channels 54,56 directly in a direction opposite to the direction of the overpressure provided by plenum or main blowers 46, 48 or present in cab12.

FIGS. 6A and 6B show a suitable configuration for the non-return valves 54V, 56V in the respective bypass lines 54, 56. A deformable disc of silicone rubber 64 is positioned over one or more apertures 66 in a surface 68 which otherwise provides an air blockage. As shown in FIG. 6A, air pressure from a first (lower) side of the surface (being in communication with plenum or main blowers 46, 48 or present in cab12) is sufficient to cause the disc 64 to deform, opening the apertures 66 and allowing airflow. However, as shown in FIG. 6B, air pressure on the second (upper) side (being in communication with outlets 36, 42 of filtration device 34, 40) of the surface 68 serves to hold the disc 64 against the surface 68, thereby sealing the apertures 66. Alternatively, non-return valves 54V, 56V may be designed as flap-type non-return valve comprising a flap which is kept closed by a biasing spring in one direction while in the other direction, the flap can be opened against the force of the spring.

FIG. 7 is a schematic plan, looking down from above, of a preferred layout of the system components within the roof 22. The front of the tractor 10, and the usual direction of travel, is indicated by the arrow A.

The first and second filters 34, 40 are mounted to one side of the roof with the pressurisation blower 46 located between. In this case cylindrical filters with the filter medium arranged in circumferential orientation around an axis indicated with arrow C are installed, whereby the axis C is aligned longitudinal in driving direction A. Inlets 28 to the filters 34, 40 are represented by arrows 28. The physical inlets 28 are positioned below the respective filters in an underside of the roof assembly 22 forming an eaves projection outside of the cab 12. Openable covers 34C, 40C in the sidewall of the roof assembly enable user access to the respective filter devices 34, 40 for inspection, maintenance or replacement purposes. Controlled flaps in the conduit linking the filters 34, 40 to the pressurisation blower provide the valve mechanism 38 which controllably connects either of the filters 34, 40 to the pressurisation blower.

Adjacent one of the filters 34, to the rear of the roof 22, is the main blower 48 connected to the pressurisation blower 46 via duct 62. The output from the main blower 48 is passed through the additional components in the form of evaporator 52 and heater 50, which components extend across the rear of the cab roof, before the treated air enters the cab space 12. An opening from the cab space 12 into the duct 62 provides the recirculation path 58 as described above. A filter 60 is omitted from the view of FIG. 7.

The layout of FIG. 7 provides a first benefit in that the inlets 28 for the first and second filtration devices 34, 40 are under an eaves overhang at the side of the roof which tends to being a less dusty environment than the front or rear and helps to reduce the volume of airborne material drawn into the filters. A second benefit of having the filtration system and HVAC components mounted around the periphery of the cab roof 22 is that it enables a clearance area (indicated generally by dashed line 70) giving improved user headroom in the centre of the cab.

In the foregoing, the applicants have described an air treatment apparatus for an operator environment of an agricultural vehicle in which air to be filtered is drawn into an air filtration system, filtered and directed to an agricultural vehicle HVAC system. The air filtration system comprises first 34 and second 40 filtration devices having respectively coarser and finer levels of filtration. Each filtration device 34, 40 is provided with a respective bypass 54, 56 permanently connected with an inlet end downstream of a valve mechanism 38 that selects between the filtration devices, and an outlet end upstream of the valve mechanism 38 and adjacent the respective filtration device 34, 40. In use a portion of an air flow downstream of the valve mechanism may be recirculated to purge the respective filtration device, and each bypass 54, 56 includes a respective non-return valve 54V, 56V opposing transit of air from the outlet to the inlet ends.

From reading the present disclosure, other modifications will be apparent to persons skilled in the art.

The invention claimed is:

1. An air treatment apparatus for an operator environment of an agricultural vehicle in which air to be filtered is drawn into an air filtration system, filtered and directed to an HVAC system, in which the HVAC system comprises an inlet plenum, at least one blower, other HVAC components and an outlet to the operator environment; wherein the air filtration system comprises:
   at least one external inlet;
   a first filtration device comprising a first coarser level of filtration located between the at least one external inlet and the HVAC inlet plenum;
   a second filtration device comprising a second finer level of filtration located between the at least one external inlet and the HVAC inlet plenum;
   a first air filtration system blower connected to the HVAC inlet plenum;
   a valve mechanism which selectively connects either the first filtration device to the HVAC inlet plenum or the second filtration device to the HVAC inlet plenum; and for each filtration device, a respective bypass is permanently connected with an inlet end downstream of the valve mechanism and an outlet end upstream of the valve mechanism and adjacent the respective filtration device such that in use a portion of air flow downstream of the valve mechanism may be recirculated to purge the respective filtration device, and each bypass includes a respective non-return valve opposing transit of air from the outlet end to the inlet end.

2. The air treatment apparatus according to claim 1, wherein the outlet end of each bypass is located between the respective filtration device and the valve mechanism.

3. The air treatment apparatus according to claim 1, wherein the inlet end of each bypass is configured to draw air directly from the operator environment.

4. The air treatment apparatus according to claim 1, configured such that the first air filtration system blower is connected in series to a second air filtration system blower, with the first blower located between the valve mechanism and the second blower, and the second blower is configured to produce a higher throughput of air than the first blower, wherein the inlet end of each respective bypass is connected to draw air directly from the output of the first blower.

5. The air treatment apparatus according to claim 1, configured such that the first air filtration system blower is connected in series to a second air filtration system blower, with the first blower being located between the valve mechanism and the second blower, and the second blower is configured to produce a higher throughput of air than the first blower, wherein the inlet end of each respective bypass is connected to draw air directly from the output of the second blower ahead of the other HVAC components.

6. The air treatment apparatus according to claim 1, wherein the output to the operator environment directs treated air to the operator environment by way of a cabin air supply duct wherein the inlet end of each bypass is connected to draw air directly from the cabin air supply duct.

7. The air treatment apparatus according to claim 4, comprising a recirculation line having an inlet drawing air from the operator environment and an outlet between the first and the second air filtration system blowers.

8. The air treatment apparatus according to claim 7, further comprising a third filtration device in the recirculation line.

9. The air treatment apparatus as claimed in claim 1, wherein the valve mechanism selectively connects either the first filtration device to the HVAC inlet plenum or the second filtration device to the HVAC inlet plenum such that in use air flow is directed from either the first or the second filtration device to the HVAC inlet plenum.

10. The air filtration system apparatus according to claim 1, wherein the first filtration device is adapted to filter dust particles.

11. The air filtration system apparatus according to claim 1, wherein the second filtration device is adapted to filter dust, aerosols and vapour.

12. An agricultural vehicle comprising an operator environment, and an air treatment apparatus according to claim 1.

* * * * *